United States Patent
Sbiaa et al.

(10) Patent No.: US 7,236,335 B2
(45) Date of Patent: Jun. 26, 2007

(54) MAGNETORESISTIVE HEAD

(75) Inventors: Rachid Sbiaa, Tokyo (JP); Isamu Sato, Tokyo (JP)

(73) Assignee: TDK Corporation, Tokyo (JP)

(*) Notice: Subject to any disclaimer, the term of this patent is extended or adjusted under 35 U.S.C. 154(b) by 387 days.

(21) Appl. No.: 10/949,383

(22) Filed: Sep. 27, 2004

(65) Prior Publication Data

US 2005/0105222 A1 May 19, 2005

Related U.S. Application Data

(60) Provisional application No. 60/506,742, filed on Sep. 30, 2003.

(51) Int. Cl.
*G11B 5/39* (2006.01)

(52) U.S. Cl. .................................. 360/324.1

(58) Field of Classification Search .............. 360/324, 360/324.1, 324.11, 324.12, 324.2
See application file for complete search history.

(56) References Cited

U.S. PATENT DOCUMENTS

| | | | | |
|---|---|---|---|---|
| 6,069,820 | A * | 5/2000 | Inomata et al. .............. 365/171 |
| 6,560,077 | B2 * | 5/2003 | Fujiwara et al. .......... 360/324.1 |
| 6,686,068 | B2 * | 2/2004 | Carey et al. .............. 428/811.3 |
| 6,707,649 | B2 * | 3/2004 | Hasegawa et al. ...... 360/324.12 |
| 6,937,447 | B2 * | 8/2005 | Okuno et al. ............. 360/324.1 |
| 7,002,781 | B2 * | 2/2006 | Sugawara ............... 360/324.11 |
| 7,050,276 | B2 * | 5/2006 | Nishiyama .............. 360/324.11 |
| 2004/0042127 | A1 * | 3/2004 | Hoshiya et al. ............. 360/322 |
| 2004/0201929 | A1 * | 10/2004 | Hashimoto et al. ....... 360/324.1 |

FOREIGN PATENT DOCUMENTS

| JP | A 11-510911 | 9/1999 |
|---|---|---|
| JP | A 2003-204095 | 7/2003 |

OTHER PUBLICATIONS

N. Garcia et al., "Magnetoresistance in excess of 200% in Ballistic Ni Nanocontacts at Room Termperature and 100 Oe," *The American Physical Society*, vol. 82, No. 14, pp. 2923-2926 {Apr. 5, 1999}.

N. Garcia et al., "Ballistic Magnetoresistance in Nanocontacts Electrochemically Grown Between Macro- and Microscopic Ferromagnetic Electrodes," *Applied Physics Letters*, vol. 80, No. 10, pp. 1785-1787 {Mar. 11, 2002}.

J.M..D. Coey et al., "Magnetic Excitations in a Nanocontact," *The American Physical Society*, vol. 64, No. 020407 (R), pp. 020407-1-020407-3 {Jun. 21, 2001}.

A.A. Zvezdin et al., "Spontaneous Transformations of the Magnetic Structure of a Film Nanocontact," *JETP Letters*, vol. 75, No. 10 {Apr. 15, 2002}.

\* cited by examiner

*Primary Examiner*—Angel Castro
(74) *Attorney, Agent, or Firm*—Oliff & Berridge, PLC

(57) ABSTRACT

A magnetoresistive head including a magnetoresistive element, and two shield layers sandwiching the magnetoresistive element. The magnetoresistive element includes an antiferromagnetic layer a pinned layer in exchange coupling with the antiferromagnetic layer, a free layer whose magnetization rotates or switches according to a media magnetic field, and an intermediate layer between the free layer and the pinned layer. The intermediate layer includes magnetic grains surrounded by an insulator. The magnetic grains connect the free layer and the pinned layer by means of a nano contact. The free layer is oversized with respect to the pinned layer and the intermediate layer which are distanced from a media side end of the shield layers.

12 Claims, 3 Drawing Sheets

MAGNETORESISTIVE HEAD

BACKGROUND OF THE INVENTION

1. Field of the Invention

The present invention relates to a magnetoresistive head with an oversized free layer for thermal and magnetic stability.

2. Description of the Related Art

In a conventional head, a spacer between a free layer and a pinned layer is non-magnetic (comprising either a conductive layer in the case of GMR, or an insulator in the case of tunneling TMR). Therefore the magnetic flux of the media (media flux) will change the magnetization direction of the free layer only. The magnetization of the pinned layer is fixed and not being affected by the media flux.

In a ballistic magneto resistive head (hereinafter BMR head) of the present invention, a higher MR ratio can be achieved compared to giant magneto resistive (GMR) or tunneling magnetoresistive (TMR) cases.

As disclosed in G. Tatara et. al., Phys. Review Letters, Vol.83, the origin of BMR results from an additional resistance of a magnetic domain wall in a nano-contact between two ferromagnetic layers or wires. The magnetic domain wall is created when the magnetization in these two ferromagnetic layers are anti-parallel. The size of the magnetic domain wall is in the nanometer scale, the scattering of electron is strong.

The BMR value depends on the magnetic domain wall configuration and the scattering of electron when the electron passes through the magnetic domain wall in the nano-contact region. For the application of BMR to a read head it is important to guarantee the stability of the nano-contact against an external field. Its magnetic configuration should be determined only by the change in the free layer magnetization direction.

SUMMARY OF THE INVENTION

The object of this invention is to provide a new design, and positioning of different layers in the film structure so that only the free layer will be affected by media flux. Furthermore, this design will also solve thermal stability issues in both free and pinned layers.

DESCRIPTION OF THE PREFERRED EMBODIMENTS

Figure 1:
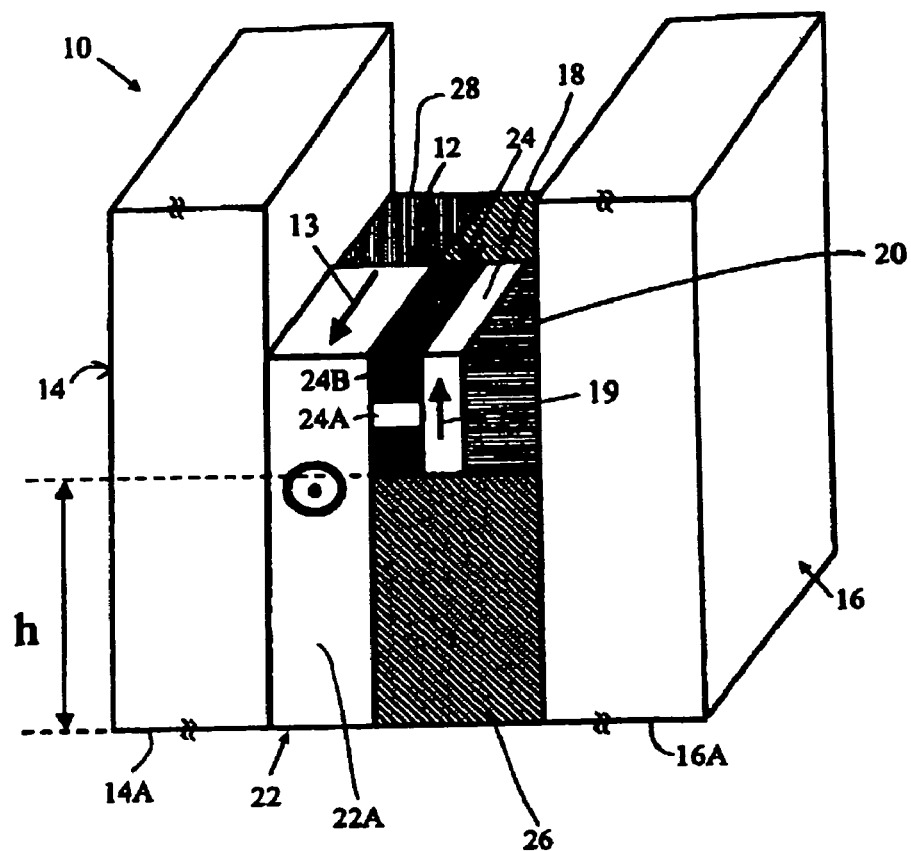
FIG. 1 is a perspective view showing an enlarged schematic representation of a magnetoresistive head according to a first embodiment of the present invention.

Now, the present invention is more specifically described with reference to the accompanying drawings, wherein similar constituent elements are designated by the same or similar reference numerals.

Referring to FIG. 1, which shows a magnetoresistive head 10 according to a first embodiment of the present invention, the magnetoresistive head 10 comprises a magnetoresistive element 12, and two shield layers 14 and 16 sandwiching the magnetoresistive element 12. The magnetoresistive element 12 comprises a pinned layer 18 in exchange coupling with an antiferromagnetic layer 20, a free layer 22 whose magnetization rotates or switches according to a media magnetic field, and an intermediate layer 24 between the free layer 22 and the pinned layer 18. The intermediate layer 24 includes magnetic grains 24A surrounded by an insulator 24B. The magnetic grains 24A connect the free layer 22 and the pinned layer 18 by means of a nano contact. The free layer 22 is oversized with respect to both the pinned layer 18 and the intermediate layer 24 which are distanced from a media side ends 14A, 16A of the shield layers 14, 16.

As the nano-contact part is distanced from a floating surface (media side and surface) of the magnetoresistive head, that is hard to be affected by media flux, then, a stability of the magnetic domain within the nano-contact area will be improved.

The free layer's magnetization in the easy axis of magnetization is oriented parallel to the floating surface, known as air bearing surface (ABS) of the magnetoresistive head, as shown in FIG. 1 by an arrow 13. The pinned layer's magnetization is oriented, as denoted by an arrow 19, perpendicular to the ABS and 90 degrees from the free layer's magnetization. It can be either up or down direction.

The height h of the pinned layer 18 and the intermediate layer 22 from the media side ends 14A, 16A of the shield layers 14, 16 is between 10 nm and 40 nm or preferably 20 nm and 40 nm.

The pinned layer is single, or formed from two antiferromagnetically coupled layers separated by a spacer made from Ru, Rh, Ir or their combinations.

In FIG. 1, reference numeral 26 designates an insulator between an oversized portion 22A of the free layer 22 and the shield layer, and 28 designates a stabilizer made of a hard magnet having a thickness equal to the thickness of the free layer 22.

Other parts of the film (nano-contact, pinned layer, antiferromagnetic layer) are of smaller size and distanced from the media's top surface (not shown).

The height h shown in FIG. 1 can be in a range of 10–40 nm in which, the reproductive sensitivity balances with the thermal stability in the pinned layer 18. The reproductive sensitivity tends to decrease as the free layer 22 is far from the media magnetic field, i.e., when the height h is over 40 nm. On the other hand, when the height h is decreasing the nano-contact area will be more sensitive to the media field leading to an instability of the domain wall. Both of the stability and the reproductive sensitivity will be more satisfy when the height h is in the range of $20 \text{ nm} \leq h \leq 40 \text{ nm}$.

Figure 2:
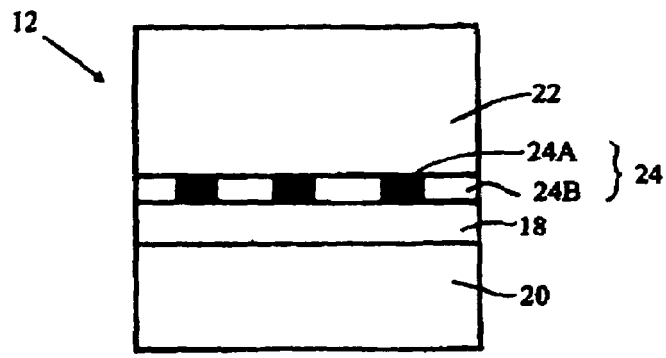
FIG. 2 is a cross-sectional view showing an enlarged schematic representation of a magneto-resistive element in the first embodiment.

The magnetoresistive element 12 is more specifically described referring to FIG. 2. In the magnetoresistive element 12, the magnetic grains 24A and the insulator 24B constitute the intermediate layer 24. The magnetic grains 24A are decoupled from each other by increasing the grain boundary region formed by the insulator 24B, which is formed from an oxide or a nitride preferably.

The pinned layer 18 and the free layer 22 are made from a magnetic single layer, a synthetic structure composed from two antiferromagnetically coupled layers separated by a non magnetic spacer like Ru, Rh, Cu etc. or composed of a multilayer like CoFe/NiFe or others.

The material of the magnetic grains 24A composing the nano-contact is made from the same or a different material than the pinned and free layers 18, 22.

The thickness of the intermediate layer 24, between the pinned layer 18 and the free layer 22, is below 10 nm. It is preferably around 1 nm. The MR ratio in BMR is much higher as the size of nano-contact (both in terms of the height and width) decreases.

For BMR, if many nano-dots or grains are formed between the free and pinned layers 22, 18, there should be no interaction. This is because the magnetic domain wall created in the nano-contact (within grains) is responsible for a high BMR. If there is an interaction between grains this might affect the magnetic domain wall and consequently the BMR.

FIG. 1 in U.S. patent 2003/0091846 A1, shows that grains of 10 nm can be made regularly using an $SiO_2$ insulator, and the grain boundary in this figure is about 1 nm.

Assisted oxidation can be performed in a vacuum chamber using a low oxygen pressure and an ion beam, which acts on the surface of the film to accelerate the oxidation of the metallic non-magnetic film.

Figure 3:
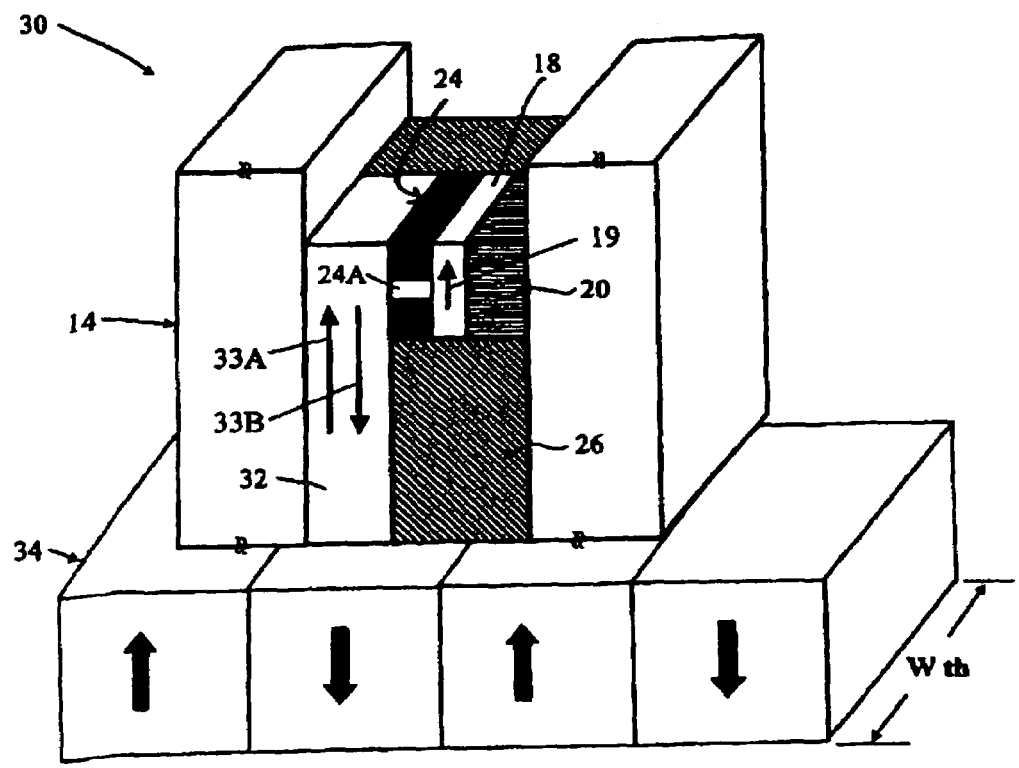
FIG. 3 is a perspective view showing an enlarged schematic representation of a magnetoresistive head according to a second embodiment of the present invention.

As shown in FIG. 3, in a magnetoresistive head 30 according to a second embodiment of the present invention, the free layer's 32 magnetization is set parallel to the pinned layer 18, namely similar to FIG. 1, with a major difference in that the free layer magnetization is parallel or and the same direction (an arrow 33A) or the opposite direction (an arrow 33B) to the pinned layer's magnetization (an arrow 19).

The second embodiment has two advantages compared to the first embodiment.

In the magnetoresistive head 10 shown in FIG. 1, the free layer's magnetization direction of an easy magnetization axis will rotate continuously by increasing the external field (media field) Usually only about 20% efficiency can be realized (for instance) when the free layer and pinned layer magnetization have initially 90° from each other (FIG. 1). The free layer 22 cannot be completely aligned in the same direction as the pinned layer magnetization.

In the magnetoresistive head 30 shown in FIG. 3, thermal stability can be increased as the free layer 32 is oversized to the pinned layer 18. In the magnetoresistive head 30, if the free layer's 32 coercivity in the easy magnetization axis is small enough, its magnetization direction will switch from one direction to the other according to the media field. This means a high efficiency (100%) can be achieved (high output). However, in this second case, it is preferable to use in-stack bias or others schemes for stability magnetization.

The second advantage for the magnetoresistive head 30 in FIG. 3 is as follows. If the free layer's magnetization is aligned in the track width $W_{th}$, as shown in FIG. 3, for high recording density the shrinkage of the media size has to be matched by reducing the head in size.

Then, as the size of the free layer in its magnetization direction become smaller, high demagnetization field in the opposite direction to the magnetization direction is generated. The thermal stability will be decreased by the demagnetization field.

In contrast, if the free layer's magnetization is set as shown in FIG. 3, and as this size of the free layer in its magnetization direction can be larger, the demagnetizing field will be smaller and a thermal stability will be improved.

Figure 4:
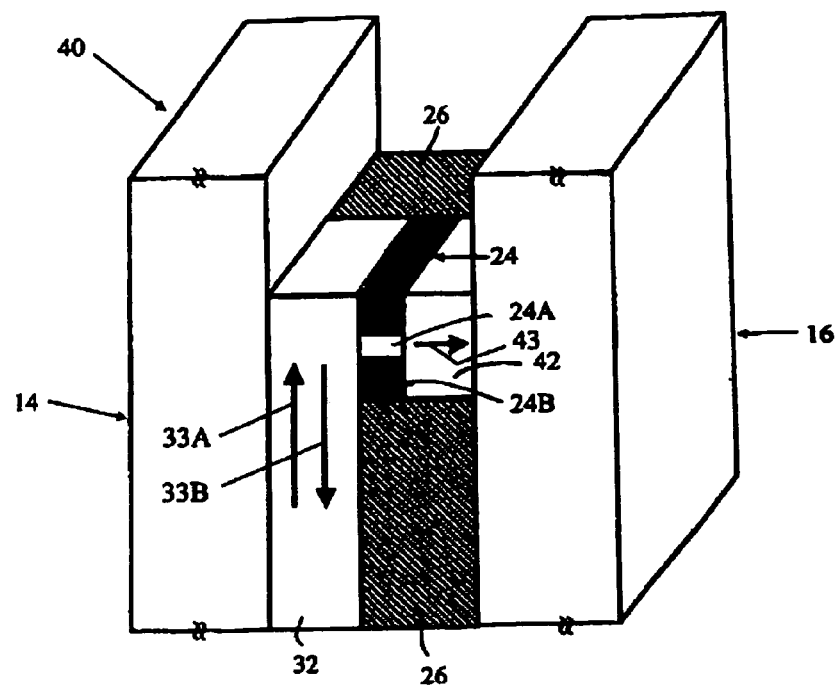
FIG. 4 is a perspective view showing an enlarged schematic representation of a magnetoresistive head according to a third embodiment of the present invention.

A perpendicular magnetoresistive head 40 according to a third embodiment is described referring to FIG. 4.

In the magnetoresistive head 40, the pinned layer is replaced by a hard layer (hard magnet layer) 42 having perpendicular magnetic anisotropy. In this case, as the hard layer is a ferromagnetic layer having high coercive force Hc, the magnetization direction of the pinned layer (hard magnet layer) 42 is not affected by other magnetic flux and changed. Then, no antiferromagnetic layer is needed. The hard layer 42 can have a high coercivity (>500 Oe) and a new type of stabilization is needed, like in-stack bias or others. In this scheme, the demagnetizing field of the pinned layer can be small and thermal stability can be obtained.

The magnetization directions of the free layer 32 are denoted by arrows 33A, 33B like as in the second embodiment and the magnetization direction of the pinned layer 42 is denoted by an arrow 43, which is perpendicular to arrows 33A, 33B.

Figure 5:
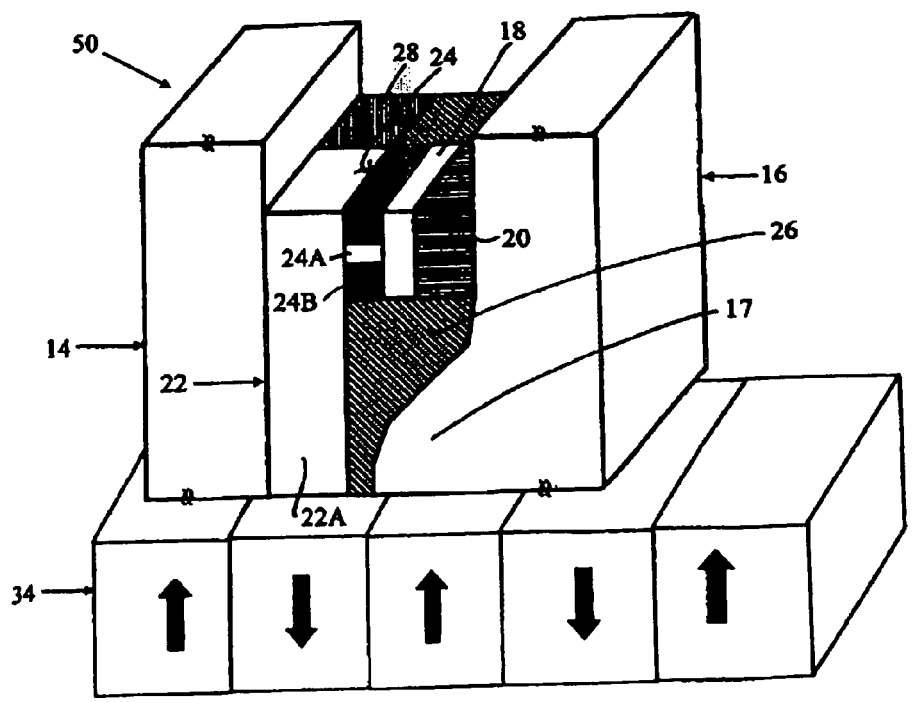
FIG. 5 is a perspective view showing an enlarged schematic representation of a magnetoresistive head according to a fourth embodiment of the present invention.

A magnetoresistive head 50 according to a fourth embodiment is described referring to FIG. 5.

In the magnetoresistive head 50, the media side part of the insulator 26 is replaced by an enlarged portion 17 of the shield layer 16 for narrowing the shield-to-shield spacing.

By adjusting the shield-to-shield spacing, a narrow bit can be sensed, and the two shields layers 14, 16 can avoid the media flux coming from adjacent bits. This would be a big advantage for narrow bit sizes. The total thickness of the BMR multilayer can be larger than the shield-to-shield spacing. This spacing can be achieved by adjusting the deposing conditions of the insulator 26.

Further, the magnetization direction may be substantially fixed in the pinned layer 12. Therefore, the antiferromagnetic layer may be replaced by a hard magnet layer having high coercive force Hc (see the third embodiment) or the pinned layer may be replaced by a hard magnet layer without the antiferromagnetic layer.

What is claimed is:

1. A magnetoresistive head comprising a magnetoresistive element, and two shield layers sandwiching the magnetoresistive element, the magnetoresistive element comprising a pinned layer whose magnetization direction is substantially fixed, a free layer whose magnetization direction rotates or switches according to a media magnetic field, and an intermediate layer between the free layer and the pinned layer, the intermediate layer including magnetic grains surrounded by an insulator, the magnetic grains connecting the free layer and the pinned layer by means of a nano contact, and the free layer being oversized with respect to the pinned layer and the intermediate layer which are distanced from a media side end of the shield layers.

2. The magnetoresistive head according to claim 1, wherein the height of the pinned layer and the intermediate layer from the media side end of the shield layers is between 10 nm and 40 nm.

3. The magnetoresistive head according to claim 1, wherein the height of the pinned layer and the intermediate layer from the media side end of the shield layers is between 20 nm and 40 nm.

4. The magnetoresistive head according to claim 1, wherein at least one of the pinned layer and the free layer is a single ferromagnetic layer, and the single ferromagnetic layer includes at least one of Fe, Co, and Ni.

5. The magnetoresistive head according to claim 1, wherein at least one of the pinned layer and the free layer is formed from two ferromagnetic layers separated and coupled by a spacer made from one selected from the group consisting of Ru, Rh, Ir and a combination thereof, and the ferromagnetic layers include at least one of Fe, Co, and Ni.

6. The magnetoresistive head according to claim 1, wherein the pinned layer is made from a hard magnet layer.

7. The magnetoresistive head according to claim 1, wherein the free layer's magnetization in an easy axis of magnetization is substantially oriented 90 degrees from the pinned layer's magnetization when there is no external magnetic field.

8. The magnetoresistive head according to claim 1, wherein the free layer's magnetization in an easy axis of magnetization is parallel or anti-paralleled to the pinned layer's magnetization.

9. The magnetoresistive head according to claim 1, wherein an insulator fills a space between an oversized part of the free layer and one of the shield layers when there is no external field.

10. The magnetoresistive head according to claim 9, wherein the media side part of the insulator is replaced by an enlarged portion of the shield layer.

11. The magnetoresistive head according to claim 10, wherein the free layer's magnetization is oriented to a direction of an oversized portion of the free layer.

12. The magnetoresistive head according to claim 10, wherein the free layer's magnetization is oriented parallel to the shield layer and perpendicular to a direction of an oversized portion of the free layer.

* * * * *